United States Patent
Wang

(10) Patent No.: US 12,355,899 B2
(45) Date of Patent: Jul. 8, 2025

(54) DEEP LINK AUTHENTICATION

(71) Applicant: Visa International Service Association, San Francisco, CA (US)

(72) Inventor: Feng Chi Wang, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 1047 days.

(21) Appl. No.: 17/046,721

(22) PCT Filed: Apr. 10, 2018

(86) PCT No.: PCT/US2018/026898
§ 371 (c)(1),
(2) Date: Oct. 9, 2020

(87) PCT Pub. No.: WO2019/199282
PCT Pub. Date: Oct. 17, 2019

(65) Prior Publication Data
US 2021/0166226 A1  Jun. 3, 2021

(51) Int. Cl.
*H04L 29/06* (2006.01)
*G06F 21/31* (2013.01)
(Continued)

(52) U.S. Cl.
CPC ............ *H04L 9/3271* (2013.01); *G06F 21/31* (2013.01); *G06F 40/134* (2020.01);
(Continued)

(58) Field of Classification Search
CPC ............... H04L 9/3271; H04L 63/0838; H04L 63/0853; H04L 67/02; G06F 40/134; G06F 21/31; G06Q 20/3821; G06Q 20/401
(Continued)

(56) References Cited

U.S. PATENT DOCUMENTS 7,107,221 B1 * 9/2006 Tracy ................. G06Q 30/0635
705/26.81
7,684,835 B1 * 3/2010 Vu .................... H04W 52/0229
455/574

(Continued)

FOREIGN PATENT DOCUMENTS

CN 101662364 A 3/2010
CN 102202067 A 9/2011
(Continued)

OTHER PUBLICATIONS

Almulhim, Maria, and Noor Zaman. "Proposing secure and lightweight authentication scheme for IoT based E-health applications." In 2018 20th International Conference on advanced communication technology (ICACT), pp. 481-487. IEEE, 2018. (Year: 2018).*

(Continued)

*Primary Examiner* — Luu T Pham
*Assistant Examiner* — Walter J Malinowski
(74) *Attorney, Agent, or Firm* — Kilpatrick Townsend & Stockton LLP

(57) ABSTRACT

A method and system for authentication through deep-links is provided. A communication device can provide a credential to a remote server computer as part of an authentication process. The remote server computer can challenge the communication device by transmitting a deep-link containing a one-time passcode to the communication device. The communication device can activate and parse the deep-link to determine the one-time passcode. The one-time passcode can be transmitted back to the remote server computer by the communication device. The remote server computer can verify that received one-time passcode matches the sent one-time passcode in order to complete the authentication process.

15 Claims, 4 Drawing Sheets

(51) Int. Cl.
  *G06F 40/134* (2020.01)
  *H04L 9/32* (2006.01)
  *H04L 9/40* (2022.01)
  *H04L 67/02* (2022.01)
  *G06Q 20/38* (2012.01)
  *G06Q 20/40* (2012.01)

(52) U.S. Cl.
  CPC ...... *H04L 63/0838* (2013.01); *H04L 63/0853* (2013.01); *H04L 67/02* (2013.01); *G06Q 20/3821* (2013.01); *G06Q 20/401* (2013.01)

(58) Field of Classification Search
  USPC .......................................................... 713/168
  See application file for complete search history.

(56) References Cited

U.S. PATENT DOCUMENTS

| | | | |
|---|---|---|---|
| 8,881,129 B1* | 11/2014 | McKinnon | G06F 11/3688 717/168 |
| 8,935,762 B2 | 1/2015 | Moas et al. | |
| 9,350,548 B2 | 5/2016 | Bagley | |
| 10,255,589 B1* | 4/2019 | Petruzzi | G06Q 20/40 |
| 2003/0046551 A1 | 3/2003 | Brennan | |
| 2004/0064478 A1* | 4/2004 | Canesi | G06Q 10/107 |
| 2005/0138409 A1* | 6/2005 | Sheriff | G06F 21/575 726/26 |
| 2005/0143050 A1* | 6/2005 | Foll | H04M 15/00 455/406 |
| 2005/0228899 A1* | 10/2005 | Wendkos | H04L 67/306 709/219 |
| 2006/0094403 A1* | 5/2006 | Norefors | G06F 21/35 455/411 |
| 2006/0136739 A1* | 6/2006 | Brock | H04L 63/0838 713/184 |
| 2007/0055867 A1* | 3/2007 | Kanungo | H04L 9/3265 713/156 |
| 2007/0233605 A1* | 10/2007 | Mueller | G06Q 30/04 705/52 |
| 2010/0046508 A1* | 2/2010 | Vogel | H04Q 3/0025 370/352 |
| 2010/0251331 A1* | 9/2010 | Li | H04L 69/08 726/3 |
| 2010/0274732 A1* | 10/2010 | Grinchenko | G06Q 30/018 705/317 |
| 2011/0088085 A1* | 4/2011 | Novak | H04L 63/1441 709/229 |
| 2012/0130714 A1* | 5/2012 | Zeljkovic | G10L 17/04 704/235 |
| 2012/0284797 A1* | 11/2012 | Seleznev | G06F 21/1073 726/26 |
| 2013/0055368 A1* | 2/2013 | Bauckman | H04L 51/212 726/3 |
| 2014/0041009 A1* | 2/2014 | Kousaka | H04L 63/0853 726/9 |
| 2015/0244706 A1 | 8/2015 | Grajek et al. | |
| 2015/0293764 A1* | 10/2015 | Visvanathan | G06F 8/36 717/102 |
| 2015/0326672 A1* | 11/2015 | Chandwani | H04L 67/141 709/227 |
| 2015/0379626 A1* | 12/2015 | Choudhury | G06Q 30/08 705/26.3 |
| 2016/0043870 A1* | 2/2016 | Avanzi | H04W 12/041 713/176 |
| 2016/0048828 A1* | 2/2016 | Lee | G06Q 20/401 705/39 |
| 2016/0127348 A1 | 5/2016 | Bradley et al. | |
| 2017/0054789 A1* | 2/2017 | Jneid | H04L 63/145 |
| 2017/0325089 A1 | 11/2017 | Sharma et al. | |
| 2017/0331824 A1* | 11/2017 | Pender | H04L 63/0892 |
| 2017/0337542 A1* | 11/2017 | Kim | G06Q 20/386 |
| 2018/0063126 A1* | 3/2018 | Karapantelakis | G06Q 20/40 |
| 2018/0146374 A1* | 5/2018 | Golan | G06Q 20/127 |
| 2019/0097796 A1* | 3/2019 | Wang | H04L 9/0869 |
| 2019/0141041 A1* | 5/2019 | Bhabbur | G06F 21/62 |
| 2019/0296913 A1* | 9/2019 | Verma | H04L 63/0838 |
| 2019/0306153 A1* | 10/2019 | Girdhar | G06F 21/45 |
| 2019/0312861 A1* | 10/2019 | Kairi | G06F 21/36 |
| 2020/0210988 A1* | 7/2020 | Woodward | G06Q 20/409 |
| 2022/0188914 A1* | 6/2022 | Choudhury | G06Q 30/0625 |
| 2025/0016246 A1* | 1/2025 | Kouru | H04L 67/06 |

FOREIGN PATENT DOCUMENTS

| | | | | |
|---|---|---|---|---|
| CN | 103440279 A | * | 12/2013 | |
| CN | 105207777 A | * | 12/2015 | |
| CN | 105357242 A | | 2/2016 | |
| JP | 2002207680 A | * | 7/2002 | |
| JP | 2013239925 A | * | 11/2013 | ............. G06F 21/31 |
| WO | WO-200708540 A2 | * | 1/2007 | |
| WO | WO-2008127340 A1 | * | 10/2008 | ............. G06Q 10/10 |
| WO | WO-2013047534 A1 | * | 4/2013 | ............ G06Q 20/387 |
| WO | WO-2014030487 A1 | * | 2/2014 | ....... G06F 17/30899 |
| WO | WO-2016096282 A1 | * | 6/2016 | ............ H04L 9/3228 |
| WO | WO-2018042321 A1 | * | 3/2018 | |
| WO | WO-2019199282 A1 | * | 10/2019 | ............ G06F 16/951 |

OTHER PUBLICATIONS

Mahmoud, Khaled W. "Elastic password: A new mechanism for strengthening passwords using time delays between keystrokes." In 2017 8th International Conference on Information and Communication Systems (ICICS), pp. 316-321. IEEE, 2017. (Year: 2017).*
Violaris, George, and Ioanna Dionysiou. "Out-of-Band Authentication Model with Hashcash Brute-Force Prevention.", 2014 IEEE 11th Intl Conf on Embedded Software and Syst (HPCC, CSS, ICESS), pp. 794-801. IEEE, 2014. (Year: 2014).*
Sun, He, Kun Sun, Yuewu Wang, and Jiwu Jing. "Reliable and trustworthy memory acquisition on smartphones." IEEE Transactions on Information Forensics and Security 10, No. 12 (2015): 2547-2561. (Year: 2015).*
Neuman, B. Clifford, and Theodore Ts'o. "Kerberos: An authentication service for computer networks." IEEE Communications magazine 32, No. 9 (1994): 33-38. (Year: 1994).*
Tan, Chik How, and Joseph Chee Ming Teo. "Protection against web-based password phishing." In Fourth International Conference on Information Technology (ITNG'07), pp. 754-759. IEEE, 2007. (Year: 2007).*
EP18914896.8 , "Extended European Search Report", Dec. 18, 2020, 8 pages.
EP18914896.8 , "Notice of Decision to Grant", Sep. 15, 2022, 2 pages.
SG11202009985W , "Written Opinion", Aug. 23, 2022, 9 pages.
CN201880093654.X , "Office Action", Sep. 21, 2022, 17 pages.
Application No. PCT/US2018/026898, International Search Report and Written Opinion, Mailed On Dec. 10, 2018, 13 pages.
Application No. SG11202009985W, Notice of Decision to Grant, Mailed On Oct. 31, 2023, 4 pages.

* cited by examiner

DEEP LINK AUTHENTICATION

This application is a National Stage of International Application No. PCT/US2018/026898, filed on Apr. 10, 2018, which is herein incorporated by reference in its entirety.

BACKGROUND

In a typical one-factor authentication procedure, a user provides some credential to a service in order to authenticate with that service. For example, a web-based email client might request a credential in the form of a username and password. When the user provides the username and password, the email client authenticates the user, and allows the user to access their emails.

However, there are a number of security concerns associated with one-factor authentication. It is fairly easy for a fraudster to acquire a credential and authenticate as a user other than themselves. Two-factor authentication was introduced as a way to deal with this problem.

With two-factor authentication, a user not only provides a credential, but also provides some other form of proof that they are who they claim to be. For example, in a two-factor authentication system, a user can provide their credential to a remote server, then receive a challenge from the remote server. The challenge may be a challenge question that the user had set or proposed in advanced, for example, during a registration process. Another common challenge is a one-time passcode. After providing the credential, the remote server may send a challenge passcode to the user at the user's email address. The user can access their email, remember the passcode, and then return the passcode to the remote server computer as the second authentication factor.

One-time passcodes are useful because they are dynamic. Other common forms of two-factor authentication, such as challenge questions do not change frequently, and can be easily exploited once compromised. By contrast, one time passcodes change every authentication attempt, making it more difficult for fraudulent users to exploit and defeat one-time passcode based authentication systems. However, the use of one-time passcodes is frequently inconvenient to users. A user typically has to exit their currently active application, navigate to their email, read the email to find the passcode, remember the passcode, open an application, and then enter the passcode. Even though it presents a number of security benefits, many web services are reluctant to implement two-factor authentication because of the inconvenience to users.

Embodiments of the invention address these and other problems, individually and collectively.

SUMMARY

Embodiments provide for a method of two-factor authentication using deep-links. A user can receive a deep-link from an authenticating remote server computer on their communication device using a communications application, such as a texting or email application. The deep-link can contain a one-time passcode. The user can activate the deep-link, for example, by tapping or selecting the deep-link using a touch screen. When the deep-link is activated, the communication device can automatically parse the deep-link using a host application to determine the one-time passcode. The one-time passcode can be transmitted to a remote server computer, and the remote server computer can verify that the received one-time passcode matches the generated one-time passcode, completing the multi-factor authentication process.

Embodiments provide a number of advantages over conventional methods of two-factor authentication. The method according to embodiments is easier and more secure than conventional methods. Rather than having to remember a passcode and re-enter it, a user can simply select the link, and the rest of the authentication process is performed automatically. Further, because the link is received on the communication device that transmits the one-time passcode to the remote server computer, embodiments provide for an additional security benefit, in that they allow the remote server computer to verify that the user is in possession of the communication device making the request. Additionally, tapping or selecting the link provides an advantage over conventional one-time passcode based two factor authentication systems. In conventional systems, the user has to remember the one-time passcode and re-enter the passcode in a different window. This can be difficult to users, who may either misremember the one-time passcode or produce a typographical error when re-entering it. Additionally, some systems lock out users when they incorrectly enter one-time passcodes. Because the method according to embodiments does not require a user to re-enter the one-time passcode themselves, users are not at risk of incorrectly entering one-time passcodes, reducing user friction and improving the user experience.

One embodiment is directed to a method comprising: receiving, by a communication device, a link from a remote server computer via a communications application; receiving, by the communication device, an instruction to activate the link; determining, by the communication device, a one-time passcode based on the link; transmitting, by the communication device, the one-time passcode to a remote server computer via a host application running on the communication device; and receiving, by the communication device, an authentication message from the remote server computer.

Another embodiment is directed to a communication device comprising a processor; and a non-transitory computer readable medium coupled to the processor, the non-transitory computer readable medium comprising code executable by the processor for performing the above method.

Another embodiment is directed to a method comprising: generating by a remote server computer, a one-time passcode; storing, by the remote server computer, the one-time passcode or a derivative of the one-time passcode; generating, by the remote server computer, a link base on the one-time passcode; transmitting, by the remote server computer, the link to a communications application associated with a communication device, wherein the communication device determines the one-time passcode using the link; receiving, by the remote server computer, the one-time passcode from the communication device; verifying, by the remote server computer, that the one-time passcode received form the communication device matches the stored one-time passcode or a derivative of the stored one-time passcode; and transmitting an authentication message to the communication device.

In some embodiments, the authentication message can be for a transaction, and the only form of authentication for the transaction is through the use of the authentication message.

Prior to discussing specific embodiments, some terms may be described in detail.

TERMS

A "server computer" may include a powerful computer or cluster of computers. For example, the server computer can be a large mainframe, a minicomputer cluster, or a group of servers functioning as a unit. In one example, the server computer may be a database server coupled to a web server. The server computer may comprise one or more computational apparatuses and may use any of a variety of computing structures, arrangements, and compilations for servicing the requests from one or more client computers.

A "memory" may be any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "communication device" may comprise any suitable device that can be used for communication. A communication device may provide remote or direct communication capabilities. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of communication devices include desktop computers, videogame consoles, mobile phones (e.g., cellular phones), PDAs, tablet computers, net books, laptop computers, personal music players, hand-held specialized readers, etc. Further examples of communication devices include wearable devices, such as smart watches, fitness bands, ankle bracelets, rings, earrings, etc., as well as automobiles with remote or direct communication capabilities. A communication device may comprise any suitable hardware and software for performing such functions, and may also include multiple devices or components (e.g., when a device has remote access to a network by tethering to another device—i.e., using the other device as a modem—both devices taken together may be considered a single communication device). A communications device may operate a communications application.

A "link" or "hyperlink" can include a reference in an electronic document or message that lets a user display or activate another document or program. An example of a link is a HyperText markup language (HTML) link, commonly seen in web pages. A link may be presented as a colored, underlined section of text. A link may also be presented as a button, or other graphical indicator. A link may include an address, such as a uniform resource locator (URL), as well as a path directing to the linked content, a data query, and identifiers. As an example, MyApp://support?key1=value1; key2=value2, is a link to an application "MyApp" on page "support" with the query specifying that "key1" is equal to "value1" and "key2" is equal to "value2." Data such as a one-time passcode can be imbedded or included in a link, for example, as part of the query identifiers.

A "deep-link" can include a link that points, references, or connects to content within a document or program in addition to the program itself. For example, a web-page or application may host content, such as an image. A deep-link may bring the user directly to the image or a page hosting he image rather than just to the application.

A "link format" can include the manner in which a link is arranged or set out. A link format may define characteristics of a link, such that the link can be interpreted by an application or operating system. A link format may include, for example, how the link's target or destination is specified, what characters or symbols delimit data in the link, appropriate labels or identifiers, the maximum or minimum length of a link, etc. A link format may also comprise communication device characteristics (e.g., the make, model, operating system, and version number).

A "one-time passcode" (OTP) can include a passcode that can only be used once. A one-time passcode may be an alphanumeric code comprising any number of letters, numbers and special characters. A one-time passcode may be procedurally or randomly generated, and can be used as part of two-factor authentication. A one-time passcode is an example of a credential.

A "credential" may include something that provides evidence regarding the characteristics of an entity. A credential may provide evidence that an entity is what it claims to be. For example, a username and password suggests that the entity providing the username and password is the user to which the username and password are assigned. A credential may be provided as part of an authentication process.

A "communications application" can include a software application that can be used for communication. For example, a communications application may refer to an application on a communications device that allows a user to communicate with other users or entities, such as an email application, texting application, or secure messaging application. A communications application may send, receive, display, and process messages in order to facilitate communication between users and other entities, such as remote server computers.

A "host application" can include a software application that can host content or additional software. For example, a host application can host content from a remote server computer, such as a shopping application that hosts content from an external web-server associated with an online merchant. A host application can also host an application programming interface that allows the host application to communicate with other software components, such as a communications application. A host application and content, hosted or otherwise, can be access via links and deep-links. A host application can parse or otherwise process deep-links in order to navigate to the correct page or section of the host application, or to determine any information stored in the deep-link such as an OTP.

An "authentication message" can include a message relating to the authentication status of an entity. An authentication message can indicate whether an entity has been authenticated or not. For example, an authentication message can indicate to a host application that a user has been authenticated and can access content hosted on the host application. An authentication message can additionally comprise an authentication cookie.

An "authentication cookie" can include data sent from an external server and stored on a device. An authentication cookie indicates the authentication status of the device, i.e., whether the device is authenticated or not. An authentication cookie can indicate the time or duration during which the device is authenticated. When the authentication cookie expires, the device may need to re-authenticate. An authentication cookie can allow a remote server computer to provide protected content to a user via a communication device without requesting a credential from the user each time the user wants to access protected content.

A "link confirmation message" can refer to a message confirming the use of a link or a deep-link as an authentication method. A link confirmation message may be transmitted in response to receiving a credential from a user via a communication device. For example, a user attempting to login to a web service hosted on a remote server computer may provide a credential, such as a username and password to the remote server computer. The remote server computer may determine that additional authentication is needed for security purposes, and may transmit a link confirmation message to confirm that the user is willing to participate in additional authentication via a link or deep-link authentication method. A "link confirmation response" can include a response from the user's communication device indicating whether user consents to participate in additional authentication via links or deep-links. The link confirmation response may comprise a link format and an electronic address.

An "electronic address" can include an address of an entity or resource that can be reached electronically. For example, an electronic address may refer to an internet protocol (IP) address that can be used to reach a device over the Internet. Another example of an electronic address is an email address where an email message can be received by a recipient. A telephone number is another example of an electronic address.

A "resource" refers to something that may be used by an entity or transferred between entities. Examples of resources includes goods, services, information, and/or access to a restricted location A "resource provider" refers to an entity that can provide resources. Examples of resource providers include merchants, governmental agencies, etc.

DETAILED DESCRIPTION

Embodiments are directed to methods and systems for deep-link authentication. A communication device (such as a smart phone), operating a communications application (such as an email or messaging application) and a host application can receive deep-links and transmit one-time passcodes as part of an authentication process. For example, a communication device can be operating a host application such as an e-commerce application, associated with a resource provider (i.e., merchant) that sells goods or services via the e-commerce application. In order to protect the accounts and money of users, the resource provider may require a user to provide a credential (i.e., a username and password) as well as a one-time passcode as part of a two-factor authentication process. A remote server computer, which may be operated by the resource provider, may receive the credential from the communication device. The remote server computer may verify the credential and challenge the communication device by sending a deep-link to the communication device, for example, to a communications application on the communication device, or to an email address or telephone number associated with the communication device. The deep-link comprises, or has embedded within, a one-time passcode, such as a numeric or alphanumeric code. Alternatively, the remote server computer may not receive a credential, and may instead use the deep-link as the only form of authentication for the communication device.

A user can select or activate the deep-link (for example, using a touch screen on the communication device). Selecting the deep-link causes the communication device to move the focus to the host application (e.g., by moving the host application window to the foreground) or execute the host application. The host application can parse the deep-link to determine the one-time passcode and transmit the one-time passcode to the remote server computer. The remote server computer can verify that the one-time passcode matches the one-time passcode sent by the remote server computer and authenticate the communication device. The user can now use the communication device to access a protected resource (such as web content provided by the resource provider) using the communication device and the host application.

Figure 1:
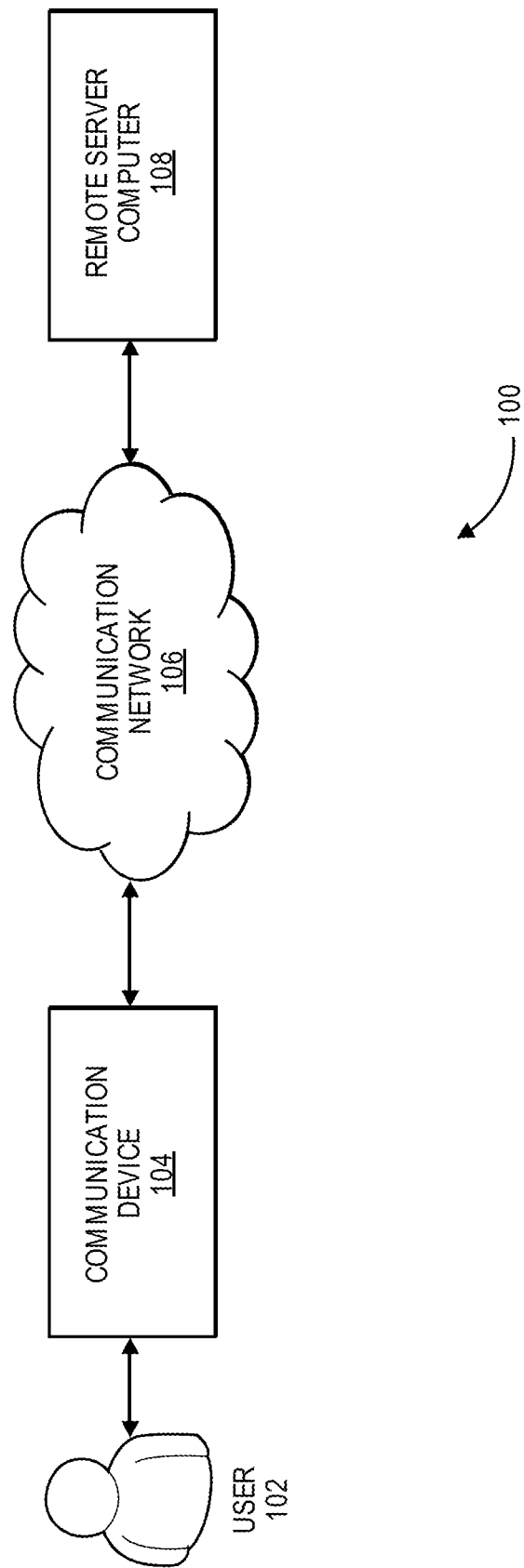
FIG. 1 shows a system block diagram of an exemplary authentication system according to some embodiments.

FIG. 1 shows a block diagram of an exemplary system 100 according to some embodiments, comprising a user 102, a communication device 104, a communication network 106, and a remote server computer 108. The communications device 104 and remote server computer 108 may be in operative communication with one another over the communication network 106.

The user 102 may be the owner or operator of communication device 104. The user 102 may be a customer or consumer, and may use communication device 104 to access resources provided by a resource provider and/or the remote server computer 108.

The communication device 104 may be a smart phone or any other appropriate communication device. The communication device 104 may be able to communicate with other devices, such as the remote server computer 108, or the user 102 via any appropriate input/output devices or peripherals.

The communication network 106 can take the form of any suitable communication network, which may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application protocol (WAP), I-mode, and/or the like); and/or the like.

Messages between the entities, providers, networks, and devices may be transmitting using a secure communications protocol such as, but not limited to, File Transfer Protocol (FTP); HyperText Transfer protocol (HTTP); Secure Hypertext Transfer Protocol (HTTPS), Secure Socket Layer (SSL), ISO (e.g., ISO 8583) and/or the like.

Figure 2:
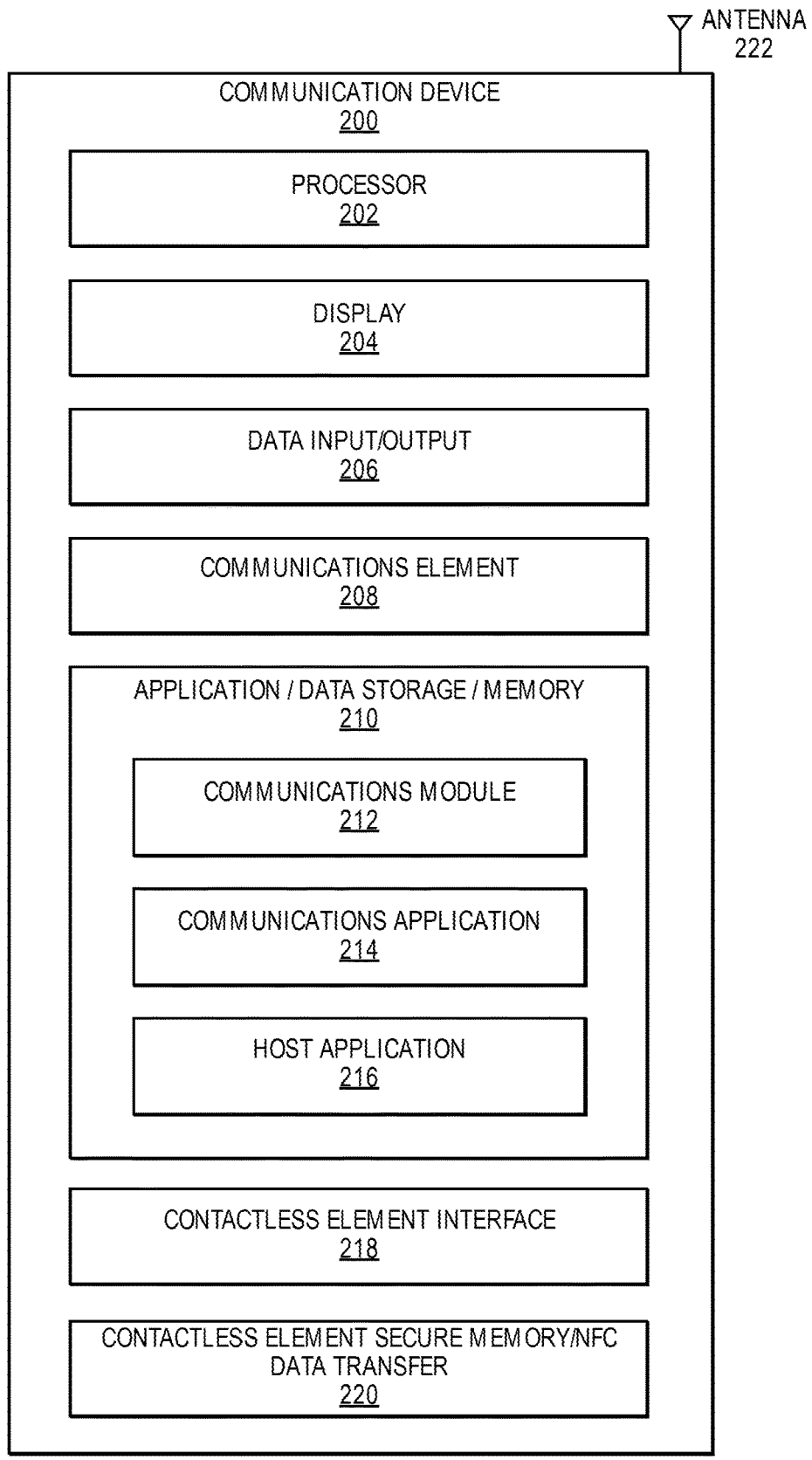
FIG. 2 shows a block diagram of an exemplary communication device according to some embodiments.

FIG. 2 shows an exemplary communication device 200 according to some embodiments. Communication device 200 may include circuitry that is used to enable certain device function, such as wireless communication or telephony. The functional elements responsible for enabling those functions may include a processor 202 that can execute instructions that implement the functions and operations of the device. Processor 202 may access data storage 210 (or another suitable memory region or element) to retrieve instructions or data used in executing the instructions. Data input/output element 206, such as a keyboard or touchscreen, may be used to enable a user to operate the communication device 200 (for example, allowing the user to navigate to a communications application 214, a host application 216, to input credentials such as a username and password, or to activate links or deep-links imbedded in documents, applications, or messages). Data input/output 206 may also be configured to output data (e.g., via a speaker). Display 204 may also be used to output data to a user. Communications element 208 may be used to enable data transfer between communications device 200 and a wired or wireless network (e.g., via antenna 222), enable data transfer functions, and assist connecting the communication device 200 to the Internet or another network. Communication device 200 may also include contactless element interface 218 to enable data transfer between contactless element 220 and other elements of the device, where contactless element 220 may include a secure memory and a near field communication data transfer element (or another form of short range communications technology). As noted, a cellular phone, wearable device, laptop computer, or other similar device is an example of a communication device 200 that may be used in accordance with embodiments.

The data storage 210 may comprise a computer readable medium, comprising code, executable by the processor 202 to implement a method. This method may involve communications between the communication device 200 and a remote server computer. The method may comprise: receiving, by a communication device 200, a link from a remote server computer via a communications application 214; receiving, by the communication device 200, an instruction to activate the link; determining, by the communication device 200, a one-time passcode based on the link; transmitting, by the communication device, the one-time passcode to a remote server computer via a host application 216 running on the communication device 200; and receiving, by the communication device 200, an authentication message from the remote server computer. This method can be understood in further detail with reference to FIG. 4.

The data storage 210 may comprise a computer readable medium that may also comprise a number of software modules, such as a communications module 212, a communications application 214, and a host application 216.

The communications module 212 may comprise code enabling the processor 202 to implement or enable communications between the communications device 200 and other devices, such as other communications devices or a remote server computer. The communications module 212 may allow communication according to any appropriate protocol, such as the Transmission Control Protocol (TCP) or the User Datagram Protocol (UDP). It may enable secure communication by establishing a secure or encrypted communication channel between the communication device 200 and a remote server computer. The communications module 212 may further allow the receipt and transmission of credentials, link-confirmation messages, link-confirmation responses, links, deep-links, one-time passcodes, and authentication messages, among others.

The communications application 214 may comprise code, executable by the processor 202, for enabling a user to receive, send, and format a variety of messages via communication device 200. For example, the communications application 214 may comprise code enabling the processor 202 to generate a graphical user interface (GUI) that enables the user to draft messages, delete messages, distinguish between messages that have been read and messages that have not been read, categorize messages into different folders or subfolders, maintain an address book of message recipients, etc. Examples of communications applications include applications for receiving and sending emails, text messages, or pictures and video, as well as social networking applications.

A communications application 214 may, in conjunction with the processor 302, receive one or more messages containing one or more deep-links that link to other applications stored on the application/data storage/memory 210, including deep-links to a host application. The communications application 214 may provide code, executable by the processor 202 enabling a user to select or activate deep-links received in messages. For example, the communications application 214 can provide code enabling the processor 202 to interpret input data via data input/output 206, such as tapping a deep-link on a touch screen as a selection of the deep-link.

The communications application 214 or other software (such as an operating system) may cause the processor 202 to run the application associated with the deep-link. For example, for a deep-link linking to content within the host application 216, activating the deep-link may cause the processor 202 to display the GUI associated with host application 216 on display 204. The processor 202 may switch the focus to the host application 216, and may allocate additional processing power to the host application 216. Further, activating the link may cause the link, or data contained within the link (such as a one-time passcode) to be passed to the host application 216, or interpreted by the host application 216.

The host application 216 can comprise code, executable by the processor 202 for performing functions related to the host application or hosted content. This may comprise displaying a graphical user interface of the host application via display 204. The host application 216 may take a variety of forms, and the following are intended only as non-limiting examples. As one example, the host application could be a commerce application associated with a given resource provider or merchant. The host application 216, in conjunction with the processor 202, provides functionality relating to performing transactions and organizing shipment or return of purchased goods. The host application 216 can provide a graphical display of goods or services along with price, and can enable the user to input credentials, such as a username and password or payment credentials (such as a payment account number) in order to purchase goods or services. The host application 216 may host a service or other application that handles the secure processing of payment information. As another example, the host application 216 may be an online banking application, and may display information relating to the content of accounts, account or credit card statements, and may facilitate the transfer of funds between accounts. As yet another example, the host application may be a cloud-based secure storage application that stores sensitive documents (e.g., medical records) that the user wants protected from unauthorized access.

The host application 216 may communicate with a remote server computer via the processor 202, communications element 208, communications module 212, and antenna 222. The host application 216 may send and receive credentials to the remote server computer, link confirmation responses, and one-time passcodes as part of methods according to some embodiments. These methods may be better understood with reference to FIG. 4.

Figure 3:
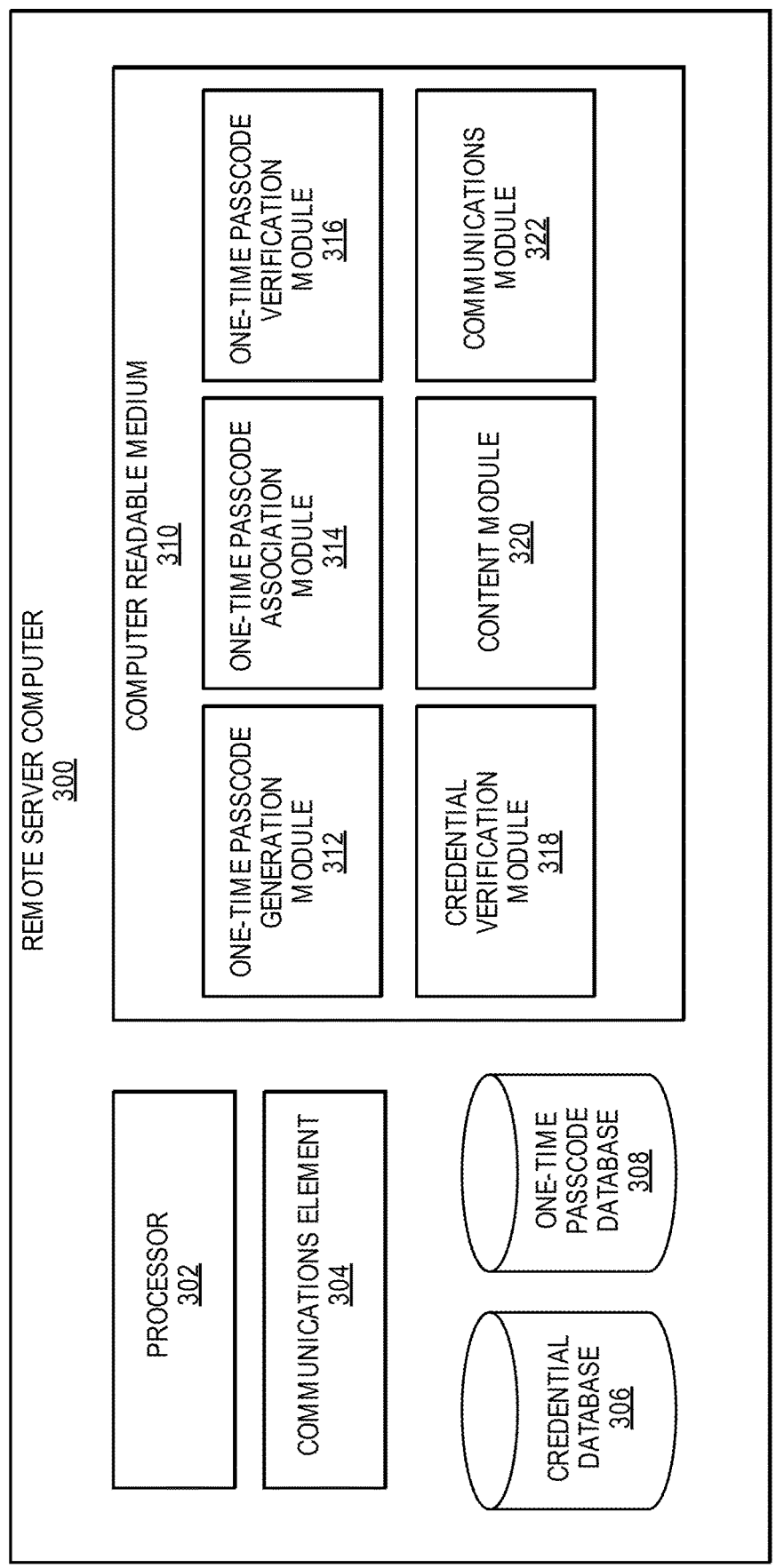
FIG. 3 shows a block diagram of an exemplary remote server computer according to some embodiments.

FIG. 3 shows an exemplary remote server computer 300 according to some embodiments of the invention. The remote server computer 300 may include circuitry or programming that is used to enable certain functions, such as receiving credentials and one-time passcodes, storing credentials and one-time passcodes, generating one-time passcodes, verifying credentials and one-time passcodes, etc. The functional elements responsible for enabling those functions may include a processor 302 that can execute instructions that implement the functions and operations of the device. Processor 302 may access computer readable medium 310 (or another suitable memory region or element) to retrieve instructions or data used in executing the instructions. Communications element 304 may be used to enable data transfer between remote server computer 300 and a wired or wireless network, enable data transfer functions, and/or to assist in connectivity to the Internet or another network.

The credential database 306 may comprise a repository or storage of credentials, for example, usernames and passwords or derivatives of usernames and passwords. For example, the credential database 306 may comprise a repository or storage of encrypted credentials, or the cryptographic hashes of credentials. The credential database 306 can store credentials in association with additional information. For example, credential database 306 can store credentials in association with an account, such as an account associated with a user with which the credentials are also associated. Credential database 306 may be implemented with any appropriate database software or hardware, and may be accessed by processor 302 using appropriate code or instructions, such as credential verification module 318. The credential database 306 may be in encrypted or unencrypted form.

The one-time passcode database 308 may comprise a repository or storage of one-time passcodes. The one-time passcode database 308 may be connected or associated with the credential database 306, such that the one-time passcodes in the one-time passcode database 308 are associated with credentials and users associated with those credentials. The processor 302 may execute code to parse through the one-time passcode database 308 and perform functions related to one-time passcodes. Such functions may include, for example, verifying that a one-time passcode received via communications element 304 matches a one-time passcode stored in one-time passcode database 308, generating and storing new one-time passcodes in one-time passcode database 308, or deleting used one-time passcodes from one-time passcode database 308.

Each database 306, 308 may be a conventional, fault tolerant, relational, scalable, secure database such as those commercially available from Oracle™ or Sybase™. In some embodiments, any of the databases may be combined into a single database, or may be separated into multiple databases.

The computer readable medium 310 may comprise a number of software modules, such as a one-time passcode generation module 312, a one-time passcode association module 314, a one-time passcode verification module 316, a credential verification module 318, a content module 320, and a communications module 322.

The one-time passcode generation module 312 may comprise code, executable by the processor 302 for generating one-time passcodes. Generating one-time passcodes can be accomplished in a number of ways. As a non-limiting example, the one-time passcode generation module 312 could comprise code, executable by the processor 302 for generating random alphanumeric sequences, verifying that the alphanumeric sequences are not already assigned in the one-time passcode database 308, and assigning those random alphanumeric sequences as one-time passcodes.

The one-time passcode generation module 312 may additionally comprise code enabling the generation of links and deep-links from one-time passcodes and other information received by the remote server computer (e.g., a link format). For example, after generating a one-time passcode "ALG123" the one-time passcode generation module 312 can generate a deep-link such as "MyApp://?OTP=ALG123." This deep-link indicates that the application "MyApp" should be opened or operated and should be passed the string "OTP=ALG123" as a query. When the deep-link is activated on a communication device, the application "MyApp" can receive the string and interpret it to determine that the one time passcode (OTP) is "ALG123."

The inclusion of a link format is desirable because different communication devices, running different operating systems, host applications, and communications applications, may have specific formats for links and deep-links. By generating the link or deep-link using the one-time passcode and the link format, the one-time passcode generation module 312 ensures that the received link or deep-link can be understood by the receiving communication device.

The one-time passcode association module 314 may comprise code, executable by the processor 302 for storing one-time passcodes in the one-time passcode database 308. In some embodiments, the one-time passcode association module 314 may comprise code, executable by the processor for associating stored one-time passcodes in the one-time passcode database 308 with credentials or other user information stored in either the credential database 306 or the one-time passcode database 308.

The one-time passcode verification module 316 may comprise code, executable by the processor 302 for determining whether a one-time passcode received by the remote server computer 300 via communications element 304 matches a one-time passcode stored in the one-time passcode database 308. For example, as part of authenticating a user, the remote server computer 300 may receive a credential from the user via a communications device, such as a username and password. The remote server computer 300 may verify the credential using credential verification module 318, and may challenge the user to a second authentication step using links or deep-links. After generating a one-time passcode and storing the one-time passcode in association with user information or the credential (using modules 312 and 314 respectively), the remote server computer 300 can transmit the deep-link to the communication device. Upon receiving a one-time passcode back from the communication device, the processor 302, using code from the one-time passcode verification module 316 can search or parse through the one-time passcode database 308 and determine whether the received one-time passcode matches the one-time passcode generated for that particular user and communication device.

The credential verification module 318 may comprise code, executable by the processor 302 for verifying received credentials. This may comprise searching a credential database 306 to determine that received credentials match credentials stored in credential database 306. For example, the credential verification module 318 may comprise code, executable by the processor 302 for searching or parsing a credential database for a received username, then comparing an associated password or derivative of a password with a received password, derivative of a received password, or received derivative of a password to determine that it matches with the associated entity in the database.

The content module 320 may comprise code, executable by the processor 302 for delivering content, resources, or other data to host applications operating on devices such as the communication device. For example, if the remote server computer 300 manages content for an e-commerce host application, the remote server computer 300 can provide content such as images of goods or service, statistics (such as their weight, size, the number remaining in stock, price, etc.), information about past orders, returns, shipping locations, deals, discounts, reviews, recommendations, etc.

The communications module 322 may comprise code enabling the processor 302 to implement or enable communications between the remote server computer 300 and other devices, such as communication devices. The communications module 322 may allow communication according to any appropriate protocol, such as the Transmission Control Protocol (TCP) or the User Datagram Protocol (UDP). It may enable secure communication by establishing a secure or encrypted communication channel between the remote server computer 300 and a communication device. The communications module 322 may further allow the receipt and transmission of credentials, link confirmation messages, link confirmation responses, links, deep-links, one-time passcodes, and authentication messages.

Figure 4:
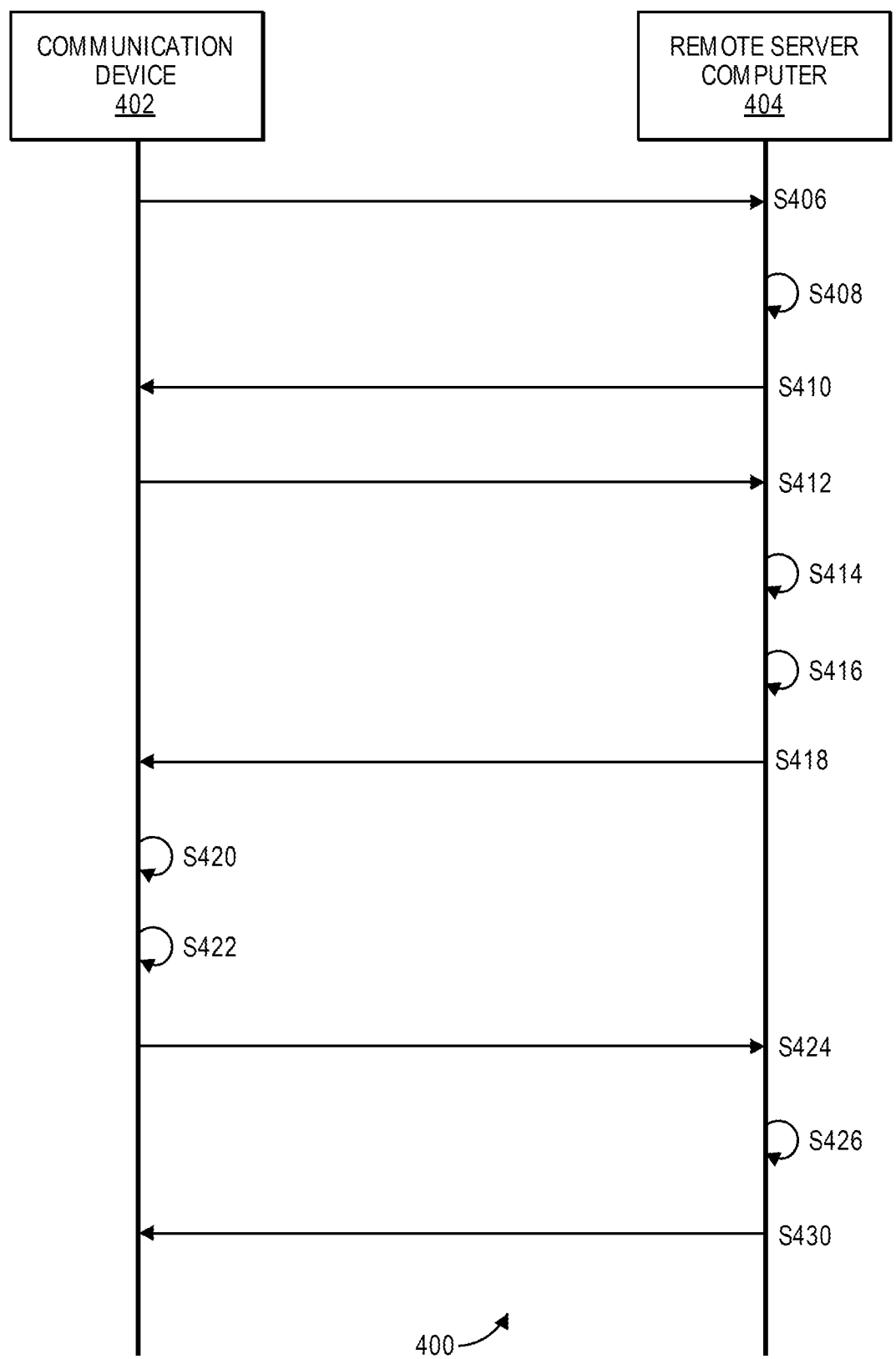
FIG. 4 shows a diagram of exemplary communications between a communication device and a remote server computer according to some embodiments.

FIG. 4 shows a communications flow diagram 400 between a communication device 402 and a remote server computer 404.

At step S406, the communications device 402 can transmit a credential to the remote server computer 404. The credential may comprise a username and password or another appropriate credential, such as a PIN, phone number, device identification number, or the like. The communications device 402 may transmit the credential to the remote server computer 404 as part of a login attempt. For example, a user can attempt to login to a host application (such as a personal banking application) running on communication device 402. As part of the login procedure, the user may enter a username and password (i.e., credential) that the communications device 402 transmits to the remote server computer 404.

At step S408, the remote server computer 404 can verify that the received credential matches a corresponding credential in a credential database. For example, the remote server computer 404 may maintain a database or other record of all users registered with the service. The remote server computer 404 can search, parse, or otherwise query the database in order to determine if the provided credential matches a credential stored in the database in association with a user. For example, for a personal banking application, the remote server computer 404 can verify that a user has an account with the bank operating the remote server computer 404 and that the credential matches the credential on file (i.e., in the credential database). This can be the first authentication step in a multi-factor authentication method. In some embodiments, links or deep-links may be the only form of authentication, in which case, steps S406 and S408 are optional.

At step S410, the remote server computer 404 can transmit a link confirmation message to the communication device 402. The link confirmation message may indicate to the user operating the communication device 402 that the remote server computer 404 wishes to challenge the user with a second authentication factor using links or deep-links. The link confirmation message allows the user an option to accept the challenge and provide a second credential (i.e., a one-time passcode) using deep-links, or decline the challenge and either authenticate through a different second credential (such as answering a challenge question or providing personal information), or terminate their login attempt. In some embodiments, the links or deep-links may be a first authentication factor, and as such, the one-time passcode may be a first credential.

At step S412, the communication device 402 can transmit a link confirmation response to the remote server computer 404. The link confirmation response indicates whether the user will authenticate using links or deep-links. The link confirmation response may also include an electronic address (such as an email address or phone number) where the link or deep-link containing the one-time passcode can be sent. The link confirmation response may also include a link format, indicating the correct format for a link or deep-link for the communication device 402. In some embodiments, the link format may simply be device or operating system information relating to the communication device (e.g., the name of the manufacturer, the installed operating system, and the version number). In some embodiments, link confirmation responses may not include either a link format or an electronic address, instead, the remote server computer 404 may look in a database of registered users and determine the link format and electronic address from a database entry related to a given user. For example, during a registration process, the user may have been asked for their phone number and the make and model of their communications device 402. Upon receiving the confirmation response, the remote server computer 404 could look up the database entry related to that user and determine the make and model of the communications device (and consequently, the link format) and the electronic address (e.g., phone number) associated with that communications device 402.

At step S414, the remote server computer 404 can generate a one-time passcode and store the one-time passcode or a derivative (e.g., an encrypted version of the one-time passcode or a cryptographic hash of the one-time passcode) as a stored one-time passcode. This may be accomplished with a specialized software module, such as a one-time passcode generation module, as shown in FIG. 3. The one-time passcode can be generated using any suitable means, and the following are intended only as non-limiting examples.

As a first example, the one-time passcode could be generated by generating a random alphanumeric sequence of some length (e.g., 6 characters). Further, the one-time passcode could be checked against a list of one-time passcodes maintained in a database to verify that it had not already been assigned to another user. As another example, at a previous time, the remote server computer 404 could have generated a large number of one-time passcodes. The remote server computer 404 could maintain a list of assigned and unassigned passcodes. When the remote server computer 404 assigns a passcode to communication device 402, the remote server computer 404 could randomly select a passcode from the list of unassigned passcodes and store it in association with the user or communication device 402 receiving that passcode. The passcode could be removed from the unassigned passcodes list and inserted into an assigned passcodes list. When a one-time passcode is used, it is no longer valid for that user. The one-time passcode entry stored in association with the user or communications device can be cleared, and the one-time passcode can be removed from the assigned passcodes list and returned to the unassigned passcodes list.

As stated above, there are numerous other methods by which a one-time passcode can be generated or assigned to a user. The preceding were intended only as non-limiting examples. In addition, additional steps or features can be included in order to improve the security of one-time passcode generation or one-time passcodes. For example, the one time passcode could be generated by a cryptographically secure random number generator, or stored or transmitted in encrypted form, etc.

At step S416, the remote server computer 404 can generate a link based on the one-time passcode. In some embodiments, the remote server computer 404 also generates the link based on a link format received with a link confirmation message or determined by the remote server computer 404. The link format may correspond to one or more device characteristics (e.g., the operating system, version number, manufacturer, make, and model of the communication device 402). The link or deep-link can be a packet of information containing the one-time passcode that can be activated by the user via the communication device 402 and the communications application in it in order to navigate to a host application on the communication device 402. The host application can parse the link and determine the one-time passcode before sending the one-time passcode back to the remote server computer 404 as part of deep-link authentication.

To this end, the remote server computer 404 can generate a link that can follow a format that can be interpreted by the communication device 402, references the host application, and communicates the one-time passcode. There are numerous examples of different linking formats, both for web pages (e.g., HTTP:// . . . ) and for within different operating systems. As one non-limiting example, the remote server computer 404 can append the one-time passcode as a query onto a default link, such as HostApplication://onetimepasscode/?OTP=1ALG93. This link indicates to the communication device 402 that it should open up the application titled "HostApplication" navigate to the page "onetimepasscode" and store the string "1ALG93" in a variable titled "OTP" (i.e., the one-time passcode).

At step S418, the remote server computer 404 can transmit the link to communications application associated with the communications device 402. For example, the remote server computer 404 can format an email message containing the link and transmit it to an email address associated with the user and the communications device 402. As another example, the remote server computer 404 can generate a text message containing the link and transmit it to a telephone number associated with the communications device 402.

At step S420, the communication device 402 can receive an instruction to activate the link. This may comprise the user selecting the link on the communication device 402 via an input device operatively coupled to the communication device 402, for example, by tapping a touch screen or moving a cursor over the link and pressing a confirmation button, such as the enter key. The communication device 402, its operating system, or a communications application (e.g., a client application for displaying emails or text messages) may comprise code or instructions regarding interpreting the selection and activation of links. Once the link is activated, the communications device 402 may navigate to a host application, and a specific page, segment, or subroutine of the host application based on the link. For example, for a link "HostApplication://onetimepasscode/?OTP=1ALG93," activating the link may cause the communication device 402 to navigate to the application titled "HostApplication," navigate to the page titled "onetimepasscode" and provide the variable "OTP" to the "onetimepasscode" page, assigning a value of "1ALG93" to the variable.

At step S422, the communication device 402 can determine the one-time passcode based on the link received in step S418. The communication device 402 may determine the one-time passcode via the host application running on the communication device 402. For example, the host application can parse the link and determine the one-time passcode based on the parsing. The host application could iterate through the link, and look for a special character or series of characters that indicate the start of a one-time passcode. For example, the host application could iterate through the link until it identifies the string "?OTP=". The host application could determine that the one-time passcode is the set of characters following "?OTP=", such as "1ALG93" as in the example above.

At step S424, the communication device 402 can transmit the one-time passcode to the remote server computer 404 via the host application running on the communication device 402. For example, a secure communication channel can be established between the remote server computer 404 and the communication device 402 and the one-time passcode can be transmitted via that communication channel. In some embodiments, the one-time passcode may be transmitted via a network, i.e., the communication network 106 from FIG. 1, such as the Internet.

At step S426, the remote server computer 404 can verify that the one-time passcode received from the communication device 402, or that a derivative of the one-time passcode received from the communication device 402 matches a stored one-time passcode or a derivative of a stored one-time passcode. The remote server computer 404 can maintain a collection of one-time passcodes in a one-time passcode database, and can parse through or query the database to determine if a given communication device 402 received a one-time passcode and if the passcode returned by the communication device 402 matches the one-time passcode received by the remote server computer 404.

If the received passcode matches the stored passcode, the remote server computer 404 can determine that the communication device 402 successfully completed the challenge authentication step, and is thus authenticated. The remote server computer 404 can then provide the user with access to content or functionality that requires authentication to access. For example, for a personal banking host application, a communication device 402 may need to be authenticated before the communication device 402 can be used to transfer money between accounts.

At step S430 the remote server computer 404 can transmit an authentication message to the communication device 402. The authentication message can indicate to the communication device 402 that the communication device 402 has been successfully authenticated, and can be used to access any content or perform any functions that require authentication. The authentication message may also comprise an authentication cookie that enables the communication device 402 to access a resource (such as hosted content or goods or services). In further communications with the remote server computer 404, the communication device 402 may provide the authentication cookie to the remote server computer 404 to indicate that the communication device 402 has been successfully authenticated.

In summary, embodiments provide for a convenient method of two-factor authentication using links and/or deep-links. After receiving a credential, a remote server computer can generate a one-time passcode and generate a link based off the one-time passcode. The link can be sent to a communication device (such as a smart phone) and a user can tap or select the link to activate it. Upon selecting the link, the communication device can open a host application that can parse the link to determine the one-time passcode, and transmit the one-time passcode back to the remote server computer. The remote server computer can authenticate the communication device by verifying that the received one-time passcode matches the generated one-time passcode, and transmit an authentication message back to the communication device, the authentication message indicating whether the communication device has been successfully authenticated.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method comprising:
   generating, by a remote server computer, a one-time passcode;
   storing, by the remote server computer, the one-time passcode or a derivative of the one-time passcode as a stored one-time passcode;

generating, by the remote server computer, a link having the one-time passcode or the derivative embedded therein, the link being generated in response to receiving a credential from a communication device, wherein the link is generated based on characteristic information of the communication device;

transmitting, by the remote server computer, the link to a communications application executing on the communication device, wherein the communication device determines the one-time passcode by activating the link, wherein activating the link causes the communications application to: (i) determine, based on information included in the link, a host application of a plurality of host applications that is to be executed on the communication device, and (ii) change a display of the communication device by rendering a graphical user interface associated with the host application, the host application extracting the one-time passcode from the link;

receiving, by the remote server computer, the one-time passcode from the communication device;

verifying, by the remote server computer, that the one-time passcode received from the communication device or the derivative of the one-time passcode received from the communication device matches the stored one-time passcode or the derivative of the stored one-time passcode;

transmitting an authentication message to the communication device; and providing, to the communication device, access to a resource based on authenticating the communication device, wherein the authentication message comprises an authentication cookie enabling the communication device to access the resource associated with the remote server computer.

2. The method of claim 1, further comprising:
verifying, by the remote server computer, that the credential matches a corresponding credential in a credential database;
transmitting, by the remote server computer, a link confirmation message to the communication device; and
receiving a link confirmation response from the communication device, wherein the link confirmation response comprises an electronic address associated with the communication device, wherein the electronic address is an email address or telephone number.

3. The method of claim 2, wherein the one-time passcode or the derivative of the one-time passcode is stored in association with the credential.

4. The method of claim 2, wherein the link confirmation response additionally comprises a link format, wherein the link is generated based on the link format and the one-time passcode.

5. The method of claim 4, wherein the link format corresponds to one or more communication device characteristics.

6. The method of claim 1,
wherein the credential comprises a username and password.

7. A remote server computer comprising:
a processor; and
a non-transitory computer readable medium coupled to the processor, the non-transitory computer readable medium comprising code executable by the processor for performing a method comprising:

generating a one-time passcode;

storing the one-time passcode or a derivative of the one-time passcode as a stored one-time passcode;

generating a link having the one-time passcode or the derivative embedded therein, the link being generated in response to receiving a credential from a communication device, wherein the link is generated based on characteristic information of the communication device;

transmitting the link to a communications application executing on the communication device, wherein the communication device determines the one-time passcode by activating the link, wherein activating the link causes the communications application to: (i) determine, based on information included in the link, a host application of a plurality of host applications that is to be executed on the communication device, and (ii) change a display of the communication device by rendering a graphical user interface associated with the host application, the host application extracting the one-time passcode from the link;

receiving the one-time passcode from the communication device;

verifying that the one-time passcode received from the communication device or the derivative of the one-time passcode received from the communication device matches the stored one-time passcode or the derivative of the stored one-time passcode;

transmitting an authentication message to the communication device; and providing to the communication device, access to a resource based on authenticating the communication device, wherein the authentication message comprises an authentication cookie enabling the communication device to access the re source associated with the remote server computer.

8. A remote server computer of claim 7, further comprising:
verifying, by the remote server computer, that the credential matches a corresponding credential in a credential database;
transmitting, by the remote server computer, a link confirmation message to the communication device; and
receiving a link confirmation response from the communication device, wherein the link confirmation response comprises an electronic address associated with the communication device, wherein the electronic address is an email address or telephone number.

9. The remote server computer of claim 8,
the one-time passcode or the derivative of the one-time passcode is stored in association with the credential.

10. The remote server computer of claim 8,
wherein the link confirmation response additionally comprises a link format, wherein the link is generated based on the link format and the one-time passcode.

11. The remote server computer of claim 10,
wherein the link format corresponds to one or more communication device characteristics.

12. One or more computer readable non-transitory media storing computer-executable instructions that, when executed by one or more processors, cause:

generating, by a remote server computer, a one-time passcode;

storing, by the remote server computer, the one-time passcode or a derivative of the one-time passcode as a stored one-time passcode;

generating, by the remote server computer, a link having the one-time passcode or the derivative embedded therein, the link being generated in response to receiving a credential from a communication device, wherein the link is generated based on characteristic information of the communication device;

transmitting, by the remote server computer, the link to a communications application executing on the communication device, wherein the communication device determines the one-time passcode by activating the link, wherein activating the link causes the communications application to: (i) determine, based on information included in the link, a host application of a plurality of host applications that is to be executed on the communication device, and (ii) change a display of the communication device by rendering a graphical user interface associated with the host application, the host application extracting the one-time passcode from the link;

receiving, by the remote server computer, the one-time passcode from the communication device;

verifying, by the remote server computer, that the one-time passcode received from the communication device or the derivative of the one-time passcode received from the communication device matches the stored one-time passcode or the derivative of the stored one-time passcode;

transmitting an authentication message to the communication device; and providing, to the communication device, access to a resource based on authenticating the communication device, wherein the authentication message comprises an authentication cookie enabling the communication device to access the resource associated with the remote server computer.

13. The one or more computer readable non-transitory media storing computer-executable instructions of claim 12, wherein a link confirmation response comprises a link format, the link format corresponding to one or more communication device characteristics.

14. The one or more computer readable non-transitory media storing computer-executable instructions of claim 12, wherein the one-time passcode or the derivative of the one-time passcode is stored in association with the credential.

15. The one or more computer readable non-transitory media storing computer-executable instructions of claim 13, wherein the link confirmation response additionally comprises a link format, wherein the link is generated based on the link format and the one-time passcode.

* * * * *